(12) United States Patent
Smith et al.

(10) Patent No.: US 7,007,226 B1
(45) Date of Patent: Feb. 28, 2006

(54) HIGH DENSITY VISUALIZATIONS FOR THREADED INFORMATION

(75) Inventors: Marc A. Smith, Redmond, WA (US); Steven M. Drucker, Bellevue, WA (US); Rebecca Xiong, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/392,468

(22) Filed: Sep. 9, 1999

Related U.S. Application Data

(60) Provisional application No. 60/100,420, filed on Sep. 15, 1998.

(51) Int. Cl.
*G06F 17/00* (2006.01)

(52) U.S. Cl. .................................... 715/500; 715/526
(58) Field of Classification Search ................ 707/514, 707/526; 345/420, 440; 715/514, 526, 500
See application file for complete search history.

(56) References Cited

U.S. PATENT DOCUMENTS

| | | | | |
|---|---|---|---|---|
| 5,276,793 A | * | 1/1994 | Borgendale et al. | 707/513 |
| 5,388,196 A | * | 2/1995 | Pajak et al. | 345/751 |
| 5,832,502 A | * | 11/1998 | Durham et al. | 707/104.1 |
| 5,930,809 A | * | 7/1999 | Middlebrook | 345/780 |
| 5,933,599 A | * | 8/1999 | Nolan | 345/734 |
| 5,974,407 A | * | 10/1999 | Sacks | 707/2 |
| 6,085,202 A | * | 7/2000 | Rao et al. | 707/509 |
| 6,199,098 B1 | * | 3/2001 | Jones et al. | 709/203 |
| 6,252,597 B1 | * | 6/2001 | Lokuge | 345/841 |

OTHER PUBLICATIONS

Geisler, Gary, "Making information more Accessible: A Survey of Information Visualization Applications and Techniques", Jan. 1998, "http://ils.unc.edu/~geisg/info/infovis/paper.html", pp. 1-14.*

Nahum et al., "Information Visualization", Mar. 1998, pp. 1-15.*

"Visual Insights Advizor—Components Overview," www.visualinsights.com/devedition/overview.html (undated), printed on May 3, 1999.

Windiff: A Graphical Difference Program, MSDN Library Apr., 1998.

* cited by examiner

*Primary Examiner*—Sanjiv Shah
(74) *Attorney, Agent, or Firm*—Microsoft Corporation

(57) ABSTRACT

High-density computer display visualization formats provide improved visualization of large amounts of threaded information. These visualization formats are suitable for a wide variety of threaded information environments including newsgroups, threaded Web discussions, chats, e-mail inboxes, etc. In one implementation, the threaded message visualization represents each post with a generally one-dimensional or narrow entry line. The entry lines are horizontal and arranged vertically in substantially the same indented threading arrangement as the text of a conventional prior art visualization. In other implementations, the appearance (e.g., color), length, and position of entry lines can represent additional selected information while maintaining the generally one-dimensional character of the entry lines.

49 Claims, 8 Drawing Sheets

Fig. 2 - Prior Art

```
                                                                    100
            kindergarten computer class                            /
102' —— @ @ Award winning designer for your web sit...            ↙
            @ @ Total Web Solution Provided! @ @
102'(1)
       ——Onto a formal definition of the Problem of Go...
            ┌── Re: Onto a formal definition of the Proble...
   108(1)   │     Re: Onto a formal definition of the P...
            └──── Re: Onto a formal definition of ...
   102(1) ——What I meant is this: A formal definition of ...
            Re: What I meant is this: A formal d...
               Re: What I meant is this: A fo ...
                  Re: What I meant is this: ...
                  ┌── Re: What I meant is this: —— 102(3)
                  │     Re: What I meant is ...
                  │—108(2)   Re: What I me ...
                  │              Re: Wha ...
                  └────── Mind as a formal...
   —106               Re: What I meant is this: —— 102(4)
                     Re: What I meant is this: ...
                     Re: What I meant is this: ...
                        What I meant: I have...
                     Re: What I meant is this: ...
                        Re: What I meant is ...
                        Re: What I meant is ..—— 102
               Re: What I meant is this: A fo ...
               Re: What I meant is this: A fo ...
                  Re: What I meant is this: ...
                  Re: What I meant is this: ...
   102(2) ——What I meant is this: A formal definition of ...
            Information Technology
         how can I get data from a serial port of a pc?—— 102'
         Something interesting for experts to consider: Wh...
         Information Technology
```

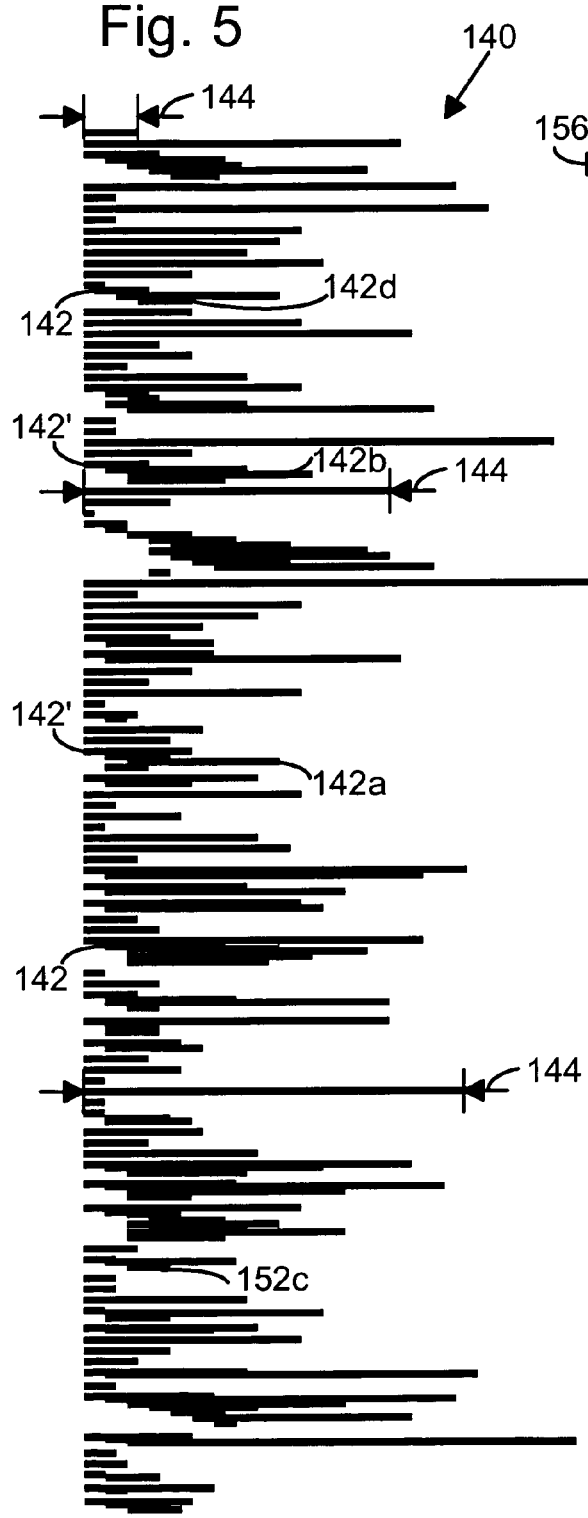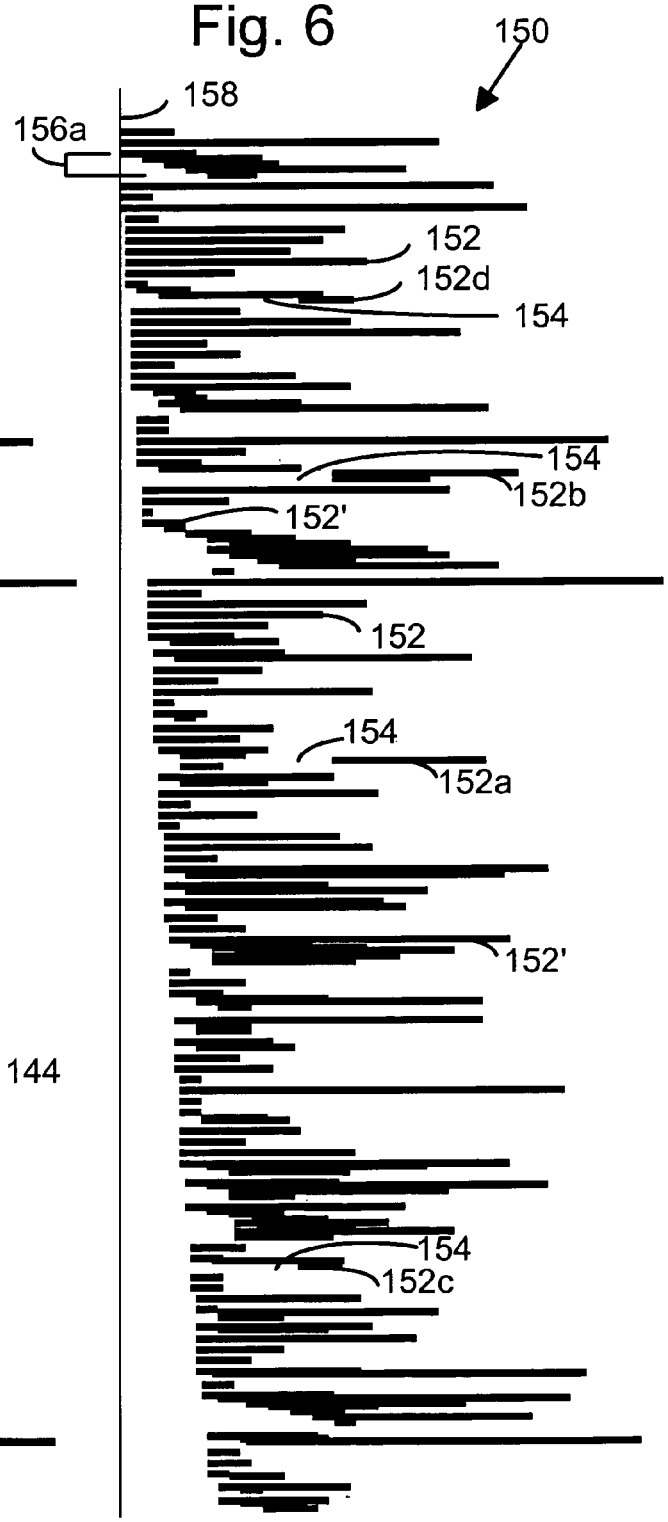

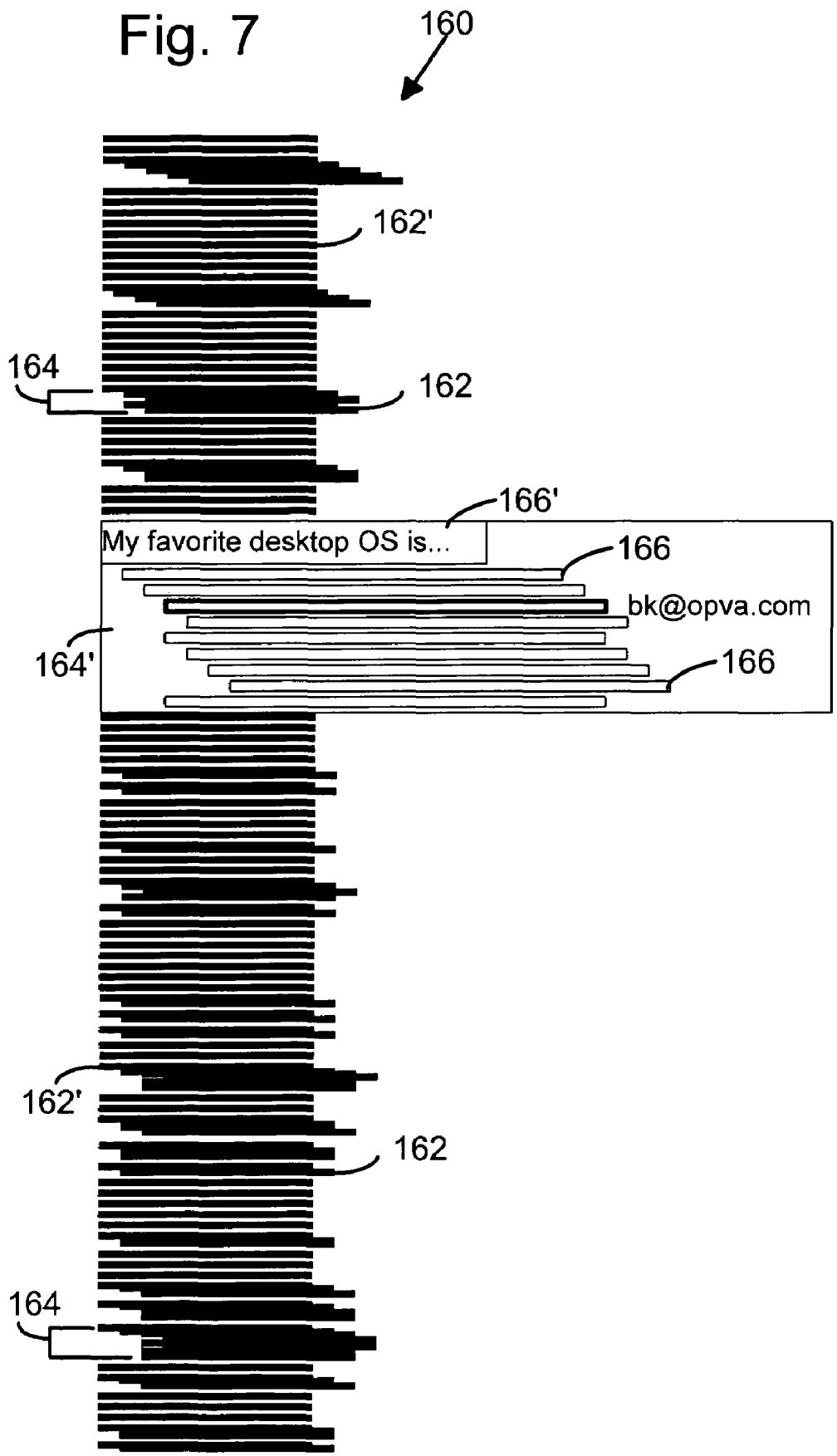

HIGH DENSITY VISUALIZATIONS FOR THREADED INFORMATION

RELATED APPLICATION

This application claims the benefit of the filing date of U.S. provisional application No. 60/100,420, filed Sep. 15, 1998.

FIELD OF THE INVENTION

The present invention relates to visualizations for interactive collaborative information and, in particular, to systems and methods for visualizing relationships in information relating to computer network interaction media.

BACKGROUND AND SUMMARY OF THE INVENTION

Many computer information systems organize hierarchically organized information, or information entries, according to links or references between the entries. An example of such information entries are bulletin board posts that reference or reply to other posts. As an organizational aid, posts that reference or reply to another post are often nested or positioned directly under it to form a "thread." Threads are organizational trees with an initial post at a top level and branches to all the responsive posts, which may themselves have branches as well. Such information systems may be called threaded information environments and can include information from the World Wide Web, Usenet newsgroups, email lists, etc.

With reference to Usenet newsgroups, for example, typical threaded information systems can have dozens or even hundreds of entries or posts. A common visualization format for a newsgroup is a vertical text listing of posts arranged generally according to the times they were posted. Threads are illustrated by positioning responsive posts in time sequence immediately under the original post in the thread.

Conventional computer displays or visualizations for such information environments can display only a small portion of the total posts in a group. This limitation arises from the use of text characters to represent each of the posts. Text characters are formed of predefined pixel arrays, which have different sizes according to the font (or typeset) and font size. Font sizes of between 9 points and 12 points are commonly used and discernible in computer display applications, although font sizes as small as 8 points may be discernible by some users. Text characters in an 8 point font size are formed of pixel arrays with vertical dimensions of 5–8 pixels. In addition, successive lines of text in a relatively dense single line spacing are typically separated by 7–8 pixels. As a result, about 16 pixels are required for each line of text referencing a post in a conventional threaded message system.

Accordingly, high-density computer display visualization formats are provided to improve the visualization of large amounts of threaded information. These visualization formats are suitable for a wide variety of threaded information environments including newsgroups, threaded Web discussions, chats, e-mail inboxes, etc.

In one implementation, the threaded message visualization represents each post with a generally one-dimensional or narrow entry line. The entry lines are horizontal and arranged vertically in substantially the same indented threading arrangement as the text of a conventional prior art visualization. Each of the entry lines is generally one-dimensional or narrow in that it has a vertical height or thickness insufficient to render text characters (e.g., 1–3 pixels). In other implementations, the appearance (e.g., color), length, and position of entry lines can represent additional selected information while maintaining the generally one-dimensional character of the entry lines.

Additional objects and advantages of the present invention will be apparent from the detailed description of the preferred embodiment thereof, which proceeds with reference to the accompanying drawings.

BRIEF DESCRIPTION OF THE DRAWINGS

FIG. 2 is a diagram illustrating an exemplary prior art computer display visualization of threaded information representing posts in a newsgroup.

FIG. 5 illustrates a high-density threaded information visualization in which information entries have lengths that correspond to selected information.

FIG. 6 illustrates a high-density threaded information visualization in which information entries have positions that correspond to selected information.

FIG. 7 illustrates a high-density threaded information visualization high highlighting of a selected thread.

DETAILED DESCRIPTION OF PREFERRED EMBODIMENTS

Figure 1:
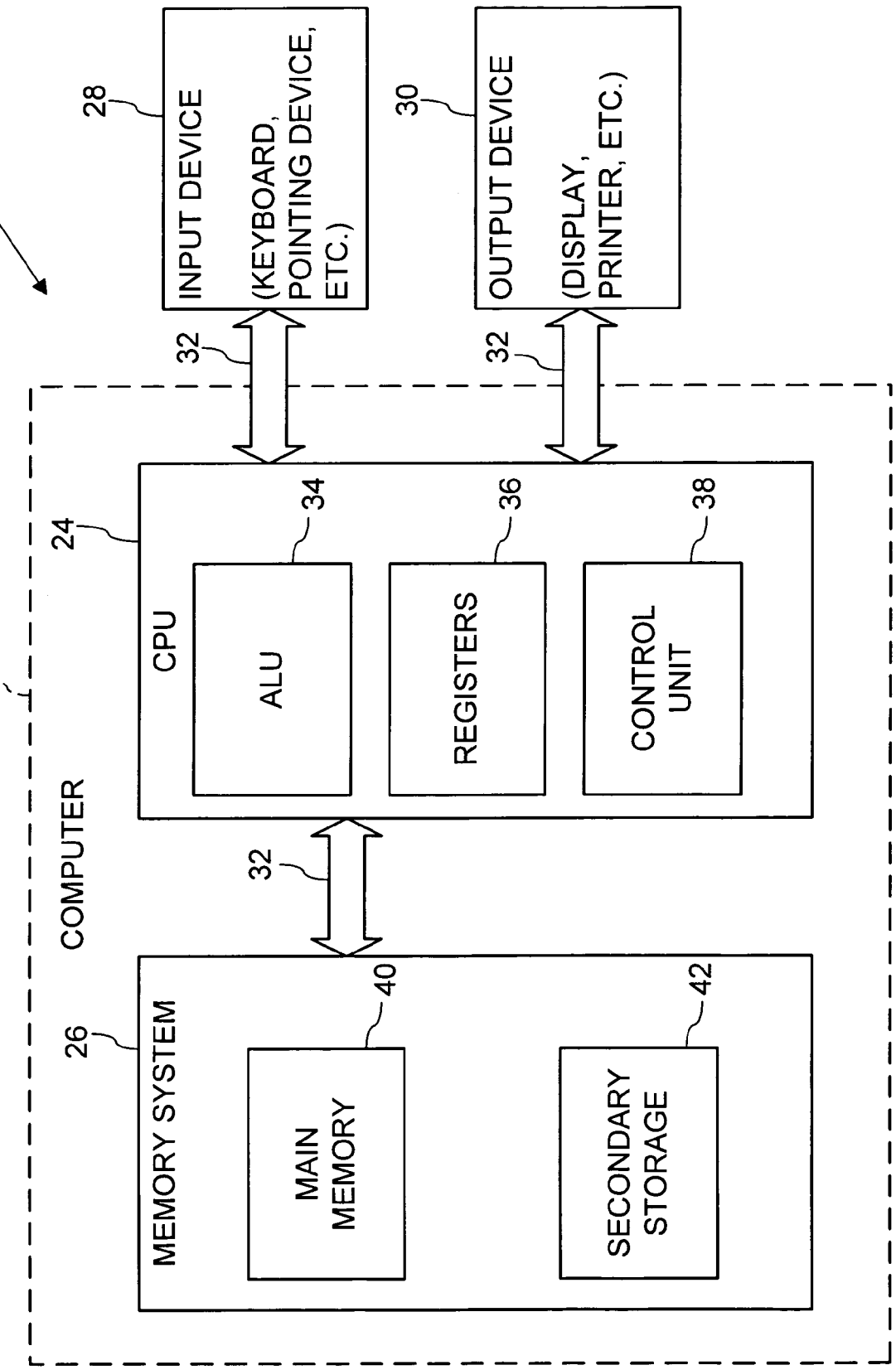
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

One implementation of the present invention provides visualizations of a threaded information environment such as is available from the World Wide Web, Usenet newsgroups, email lists, and other computer network interaction media. Some interaction media, such as Usenet (NNTP) newsgroups and some World Wide Web (HTTP) sites, include threaded message posts that form what is sometimes called a bulletin board. The following description refers by way of example to Usenet newsgroups, but is similarly applicable to other computer-related interaction media.

Usenet is a collection of messages, referred to as posts, available through the Network News Transport Protocol (NNTP). The posts available through NNTP are organized into newsgroups that are named according to a hierarchical name convention. At the highest level are 15 or more general categories, such as rec, comp, alt, sci, etc., that identify the general subject (i.e., recreation, computer, alternative, science, etc.) of a set of newsgroups. Additional terms are added hierarchically to uniquely define a newsgroup within a collection of others (e.g., comp.lang.perl.misc or rec.pets,. misc.kids.pregnancy).

Many posts reference or reply to another post. As an organizational aid, posts that reference or reply to another post are nested or positioned directly under it to form a "thread." Threads are organizational trees with an initial post at a top level and branches to all the responsive posts, which may themselves have branches as well. A post with no responses or branches is sometimes called "barren."

FIG. 2 is a diagram illustrating an exemplary prior art computer display visualization 100 of threaded posts or messages 102 in a threaded information system such as a newsgroup. Every post 102 in visualization 100 is identified by text, such as the subject line or title for the post. It will be appreciated, however, that each post or message in the newsgroup typically includes in its body text or information (e.g., data files) in addition to the subject line or title. Accordingly, it will be understood that posts 102 in visualization 100 are representations of underlying posted information (e.g., messages).

Posts 102 that reference other posts are arranged as threads 106. Posts that do not reference other posts are referred to herein as top-level posts 102', which are a subset of posts 102. Top-level posts 102' initiate threads 106 (e.g., only one thread 106 shown in FIG. 2), and the other posts 102 in the thread 106 are sometimes called inferior posts. Although a threaded information environment will commonly include many threads 106, at least some top-level posts 102' are typically not referenced by other posts 102. The top-level posts 102' that are not referenced by other posts are sometimes called barren.

Moreover, sub-threads 108 (e.g., 108(1) and 108(2)) are often initiated at posts 102 other than top-level posts 102'. These sub-threads are analogous to threads 106. For purposes of illustration, the following description will refer primarily to threads 106. It will be appreciated, however, that features of the present invention relating to threads 106 could be similarly applied to sub-threads 108.

Thread 106 is represented in visualization 100 by a left-justified top-level post 102'(1) and by grouping together right-indented posts 102 that directly or indirectly reference the top-level post 102'(1). A direct reference in a post 102 explicitly responds to or identifies the referenced post. An indirect reference responds to or identifies another post 102 that either directly or indirectly identifies the referenced post. Posts 102(1) and 102(2) directly reference top-level post 102', and posts 102(3) and 102(4) indirectly reference it.

The inferior posts 102 in a thread 106 are positioned successively below the top-level post 102'. Generally, inferior posts 102 that directly reference top-level post 102' or another post 102 in the thread 106 are positioned immediately below the referenced post (according to when the postings were made) and are indented to the right of the referenced post. Sometimes a sub-thread 108 (e.g., 108(2)) may form between successive posts (e.g., 102(3) and 102 (4)) in a thread. This arrangement of posts 102 may be referred to as an indented threading arrangement.

Typical threaded information systems can have dozens or even hundreds of entries or posts. Prior art visualization 100 can display only a small portion of the posts in such systems. This limitation arises from the use of text characters to represent each of the posts 102. Text characters are formed of predefined pixel arrays, which have different sizes according to the font (or typeset) and font size. Font sizes of between 9 points and 12 points are commonly used and discernible in computer display applications, although font sizes as small as 8 points may be discernible by some users.

Text characters in even an 8 point font size are formed of pixel arrays with vertical dimensions of 5–8 pixels. In addition, successive lines of text in a relatively dense single line spacing are typically separated by 7–8 pixels. Accordingly, about 16 pixels are required for each line of text referencing a post in a conventional threaded message system. More commonly, text characters of at least a 9 point font size would be employed, which could require at least about 18 pixels of vertical display area for each post in a threaded message system.

Figure 3:
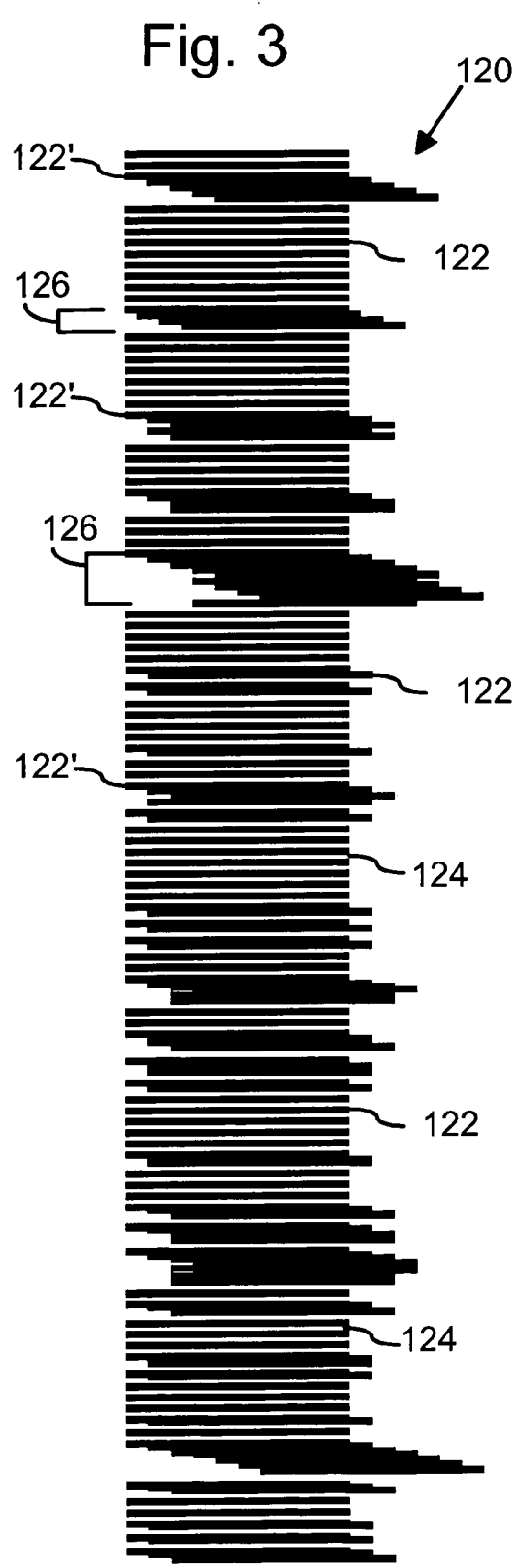
FIG. 3 illustrates a high-density visualization of threaded information according to the present invention.

In accordance with the present invention, FIG. 3 illustrates a high density computer display visualization format 120 of threaded posts or messages 122 in a threaded information system or environment such as, for example, a newsgroup. Although the following description refers to posts in a newsgroup, it will be appreciated that high density visualization 120 is similarly applicable to other threaded information environments such as threaded Web discussions, chats, e-mail inboxes, etc.

Threaded message visualization 120 represents each post with a generally one-dimensional or narrow entry line 122. In the illustration of FIG. 3, entry lines 122 are horizontal and arranged vertically in substantially the same indented threading arrangement as the text of prior art visualization of FIG. 2. Each of lines 122 is generally one-dimensional or narrow in that it has a vertical height or thickness insufficient to render text characters (e.g., 1–3 pixels). In this implementation, lines 122', which are subsets of lines 122, represent top-level posts and have a left-most alignment. Lines 122' are vertically separated from other lines 122 by minimal vertical spacings 124 of 1–2 pixels to distinguish successive threads 126. As illustrated, lines 122 within a thread 126 are not separated even by minimal vertical spacings 124, although minimal vertical spacings 124 could be employed for lines 122 within a thread 126.

Threaded message visualization 120 provides a high density representation of a threaded information environment, such as a newsgroup, threaded Web discussions, chats, e-mail inboxes, etc. Threaded message visualization 120 can represent each post in such as system with display dimensions as small as 1 or 2 pixels. For example, all lines 122 could be formed with a 1-pixel thickness, and spacings 124 of 1 pixel could be provided for top-level posts 122'. Optionally, even spacings 124 could be omitted.

In contrast, conventional visualization 100 employing text characters with a 9 point font size can require 18 pixels of vertical display area for each post. With about 30 percent of posts being threaded, for example, threaded message visualization 120 can display 6.67 times as many posts as prior art visualization 100. As a result, threaded message visualization 120 can display simultaneously information for about 214 posts in an area that could display information on only about the 32 posts illustrated in FIG. 2. In addition, the simple graphical character of visualization 120 can allow it to be easily scrolled to provide a user with information about an even greater number of posts.

FIG. 3 shows lines 122 in black. While such a visualization can provide a user with significant information about the structure of a threaded information environment, colored entry lines 122 can provide additional information while maintaining the high density of visualization 120. In various implementations, entry lines 122 may be colored according to selected information in or related to the underlying posts, messages, etc. represented by lines 122. In the context of a newsgroup, for example, entry lines 122 may be colored according to the ages of the posts represented by entry lines 122, according to the frequencies with which the authors of the posts (sometimes called posters) contribute to the group, etc. Similarly, entry lines 122 may alternatively or additional have lengths or positions according to other selected information, as described below in greater detail.

Figure 4:
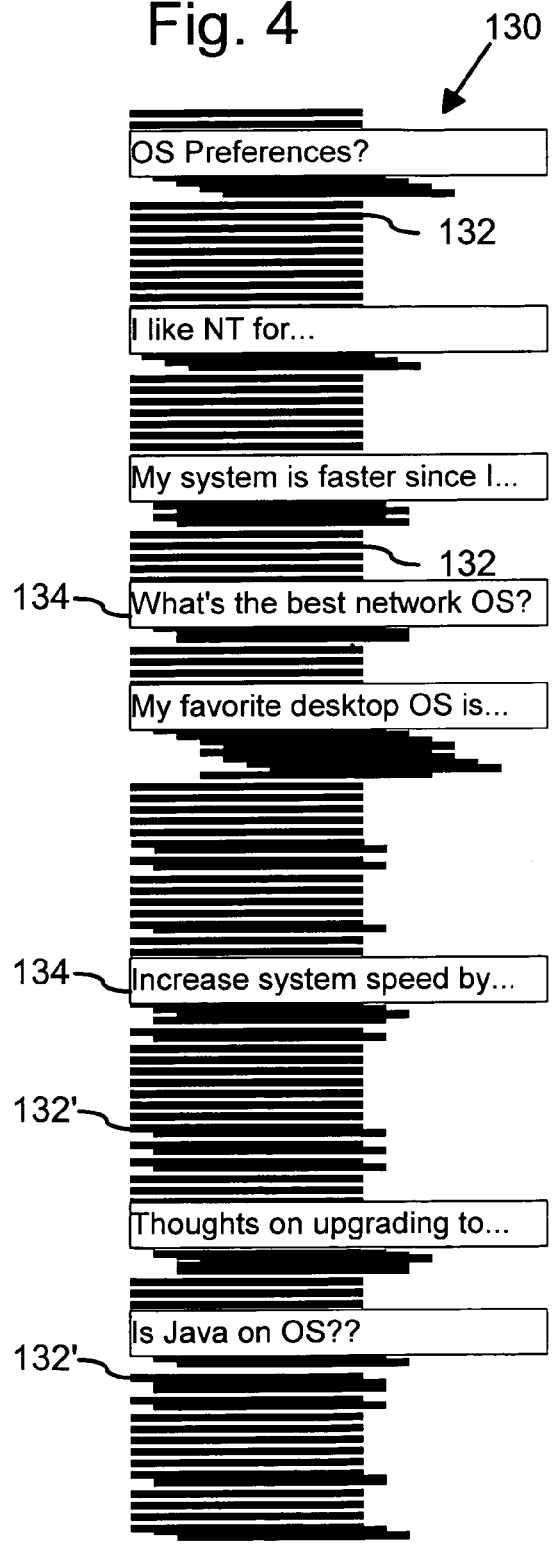
FIG. 4 illustrates a high-density threaded information visualization that includes text information.

FIG. 4 illustrates an alternative high-density computer display visualization format 130 of threaded posts or messages 132 in, for example, a newsgroup. High-density visualization 130 corresponds to substantially the same exemplary threaded information (i.e., posts) as visualization 120 in FIG. 3, except that the former truncates a portion of the information rendered in the latter.

Threaded message visualization 130 represents most posts with narrow entry lines 132 in an indented threading arrangement having lines 132' that represent top-level posts, substantially similar to visualization 120. Visualization 130 further includes, however, text entry labels 134 that include text information (e.g., a post subject line or title, as illustrated) for the top-level posts of selected threads 136'. In one implementation, the top-level posts for threads 136' having more than a predetermined number of posts 132 are rendered with entry labels 134. As illustrated in FIG. 4, entry labels 134 are rendered for top-level posts of threads with more than three posts 132. The minimum number of posts in a thread 136 at which entry labels 134 are applied may be selectable by a user observing visualization 130.

FIG. 5 illustrates another alternative high-density computer display visualization format 140 of threaded posts or messages 142 in, for example, a newsgroup. High-density visualization 140 corresponds to substantially the same exemplary threaded information (i.e., posts) as visualization 120 in FIG. 3.

Threaded message visualization 140 represents posts with generally one-dimensional narrow entry lines 142 in an indented threading arrangement with lines 142' that represent top-level posts, substantially similar to visualization 120. In addition, lines 142 of visualization 140 are rendered with lengths 144 corresponding to selected information regarding the posts represented by lines 142. For example, lengths 144 can correspond to the amount of information (e.g., numbers of text lines or characters) in the posts. While maintaining the generally one-dimensional representations of posts provided by visualization 120 (FIG. 3), visualization 140 further provides graphical additional information regarding the posts. It will be appreciated that the features of visualizations 130 (FIG. 4) and 140 (FIG. 5) could be combined together in a unitary visualization.

FIG. 6 illustrates another alternative high-density computer display visualization format 150 of threaded posts or messages 152 in, for example, a newsgroup. The exemplary high-density visualization 150 includes aspects of visualization 140 (FIG. 5) for purposes of illustrating aspects of visualization 150.

Threaded message visualization 150 represents posts with generally one-dimensional narrow lines 152 that are positioned in a modified indented threading arrangement having lines 152' that represent top-level posts, substantially similar to visualization 120. The modified indented threading arrangement of visualization 150 includes lateral shifts 154 in the positions of lines 152 according to corresponding to selected information regarding the posts represented by lines 152. For example, lateral shifts 154 can correspond to the times at which the messages represented by lines 152 are posted.

In the illustrated implementation, the inferior entry lines 152 of a thread 156 (e.g., thread 156a) include referencing indentations according to which prior posts are directly referenced. These referencing indentations are substantially similar to the rightward indentations described with reference to FIG. 3, except that the referencing indentations would optionally be smaller. In addition, entry lines 152 of a thread 156 may include additional rightward indentations 154 according to the times at which the messages represented by lines 152 are posted.

For example, no additional rightward indentation could be provided if the posting is made within a time threshold after the directly referenced posting. In this instance, the inferior entry line 152 could have only a referencing indentation. For a posting made after the time threshold, additional rightward indentations 154 could be applied according to the additional elapsed time. Alternatively, the additional rightward indentation could correspond to other time measurements such as time between readings of a message.

Examples of entry lines 152 with extreme additional rightward indentations are indicated at lines 152a–152d, which may be compared to corresponding lines 142a–142d in visualization 140 of FIG. 5. Lines 152a–152d correspond to messages that were posts relatively long after the other posts in those threads. It will be appreciated that the magnitudes of the additional rightward indentations need not be linear with the relevant time measurement. For example, the magnitudes of the additional rightward indentations could be logarithmic with the relevant time measurement so that elapsed times of relatively short and relatively long durations could be represented.

In one implementation of visualization 150, top-level posts 152' are all left justified in the manner illustrated in FIG. 5. In another implementation, top-level posts 152' could include time-based lateral (e.g., rightward) shifts, as illustrated in FIG. 6 with respect to a vertical time reference line 158 (illustrated to highlight the rightward shifts of top-level lines 152'). The top-most or most recent top-level line 152' remains at a current reference time location, and successively older top-level lines 152' are shifted rightward according to the elapsed time between when they were posted and the current reference time. The magnitudes of the shifting of the top-level lines 152' could be different (e.g., lower) than the magnitudes of the shifts of inferior lines 152 for the same amount of time, thereby allowing much more time to be represented in connection with inferior lines. It will be appreciated that the features of visualizations 130 (FIG. 4), 140 (FIG. 5), and 150 (FIG. 6) could be combined together in super- or sub-combinations as a unitary visualization.

FIG. 7 illustrates another alternative high-density computer display visualization format 160 of threaded posts or messages 162 in, for example, a newsgroup. High-density visualization 160 corresponds to substantially the same exemplary threaded information as visualization 120 in FIG. 3.

Threaded message visualization 160 represents most posts with narrow lines 162 in an indented threading arrangement that includes lines 162' for representing top-level posts, substantially similar to visualization 120. Visualization 160 further includes, however, a highlighted thread 164' that a user may select by clicking or resting a cursor over the thread 164 in its high-density form. Highlighted thread 164' includes enlarged lines or bars 166 in substitution for the narrow lines of the high density representation and a text label for the top-level bar 166'. Highlighted thread 164' allows a user to better discern the structure of posts in the thread.

Figure 8:
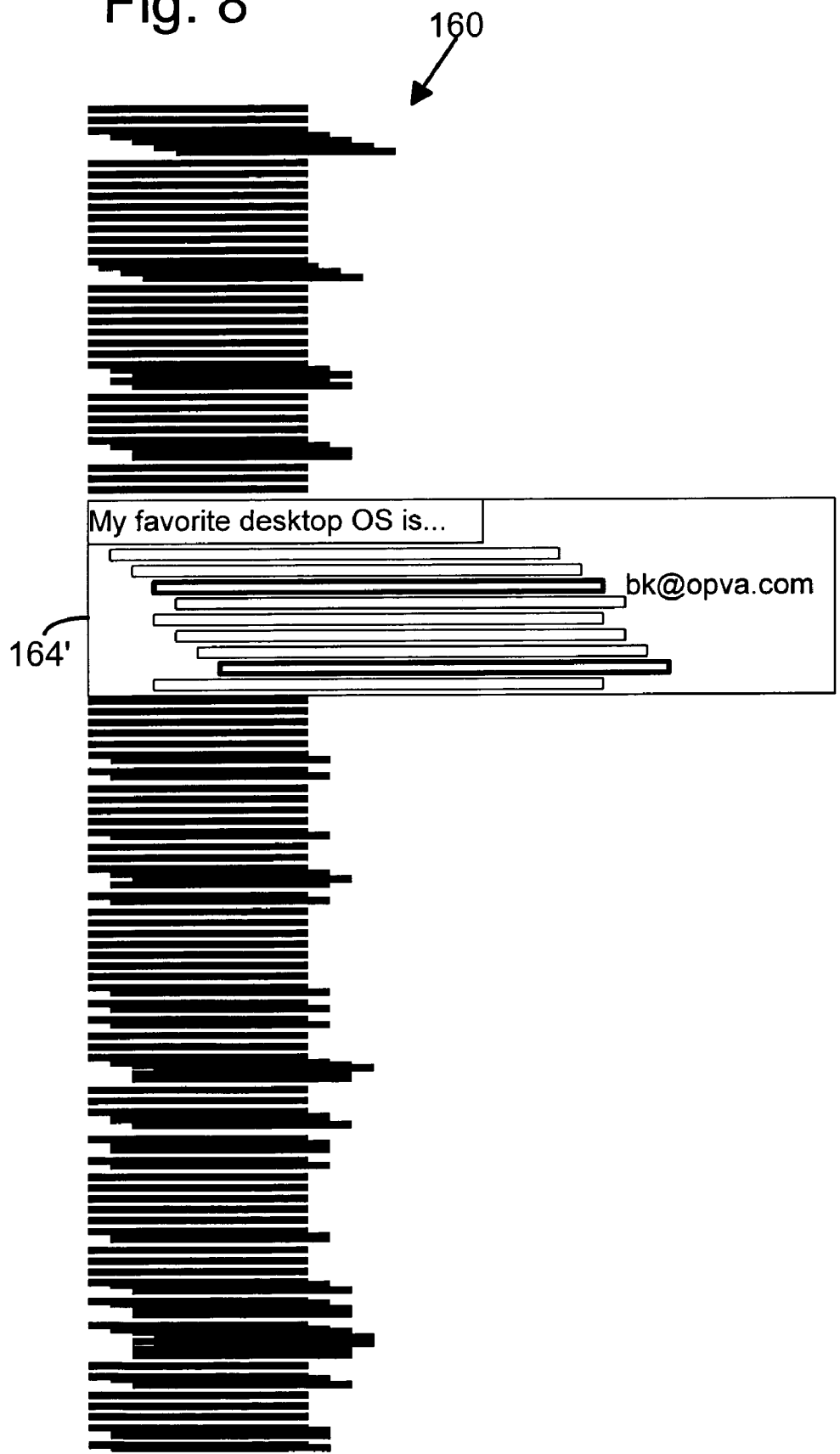
FIG. 8 illustrates a high-density threaded information visualization high highlighting of a selected thread and information entries within the thread.

As illustrated, highlighted thread 164' further allows a user to obtain additional information about individual posts 166. By clicking or resting a cursor on one of bars 166', a user may obtain additional text information about the underlying post such as the identity of the poster (as shown by the exemplary email address), the subject line or title of the post, etc. The bar 166' for which the information is provided may also be highlighted (as shown) to be more readily discernible by the user. FIG. 8 illustrates a variation of high-density computer display visualization 160 in which all messages in a highlighted thread 164' by a selected poster are highlighted (shown as darker lines).

Figure 9:
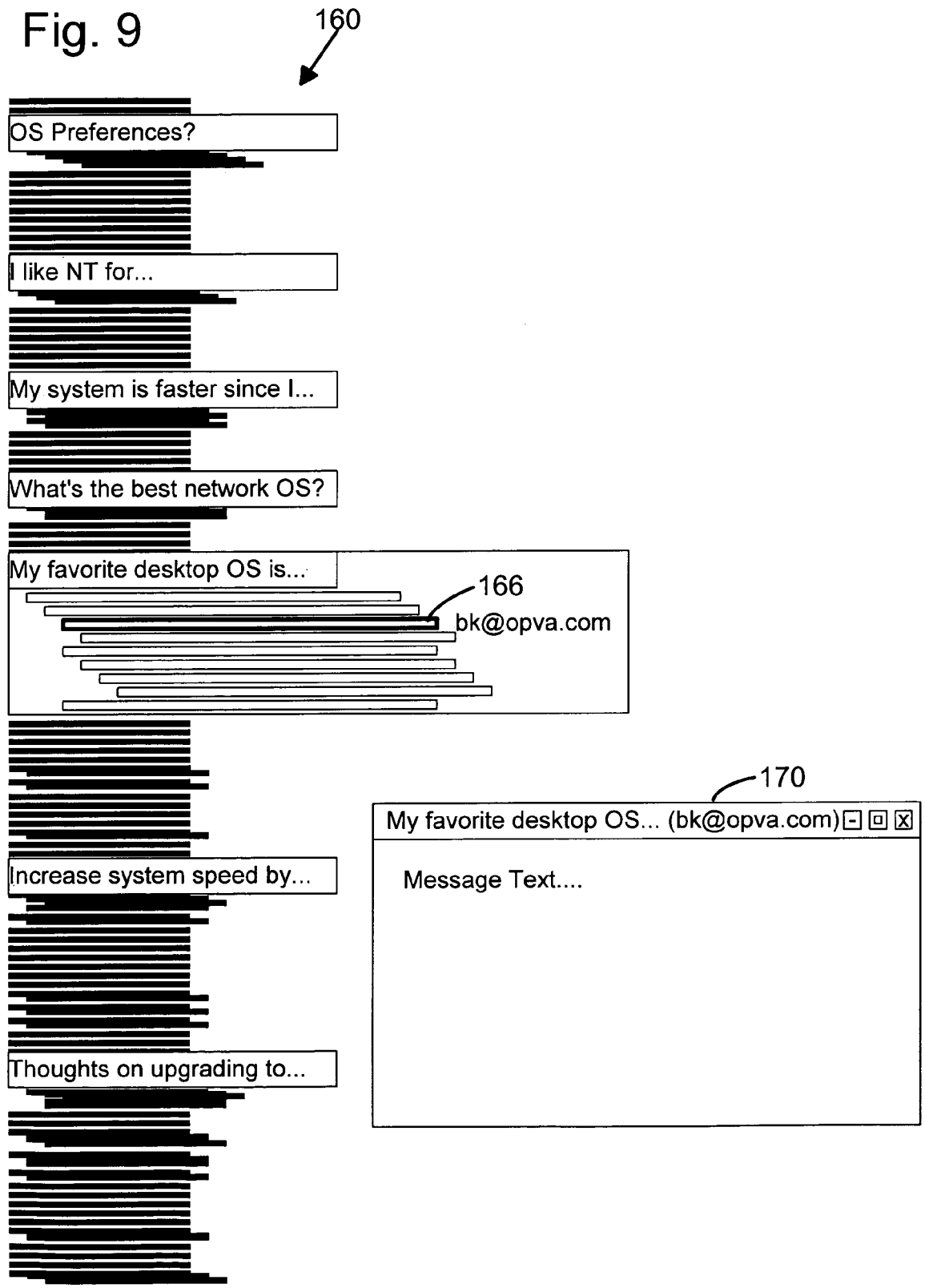
FIG. 9 illustrates a high-density threaded information visualization with a combination of features.

As illustrated, highlighted thread 164' is simplified in that it does not include the additional features of visualizations 130 (FIG. 4), 140 (FIG. 5), and 150 (FIG. 6). It will be appreciated that visualization 160 may further include features of any of visualizations 130, 140, and 150, either alone or in any combinations. FIG. 9 illustrates another variation of high-density computer display visualization 160 in combination with visualization 130 of FIG. 4. The variation of FIG. 9 includes a text or information window 170 within which is rendered some or all of the information in the post represented by selected (highlighted) bar 166.

Figure 10:
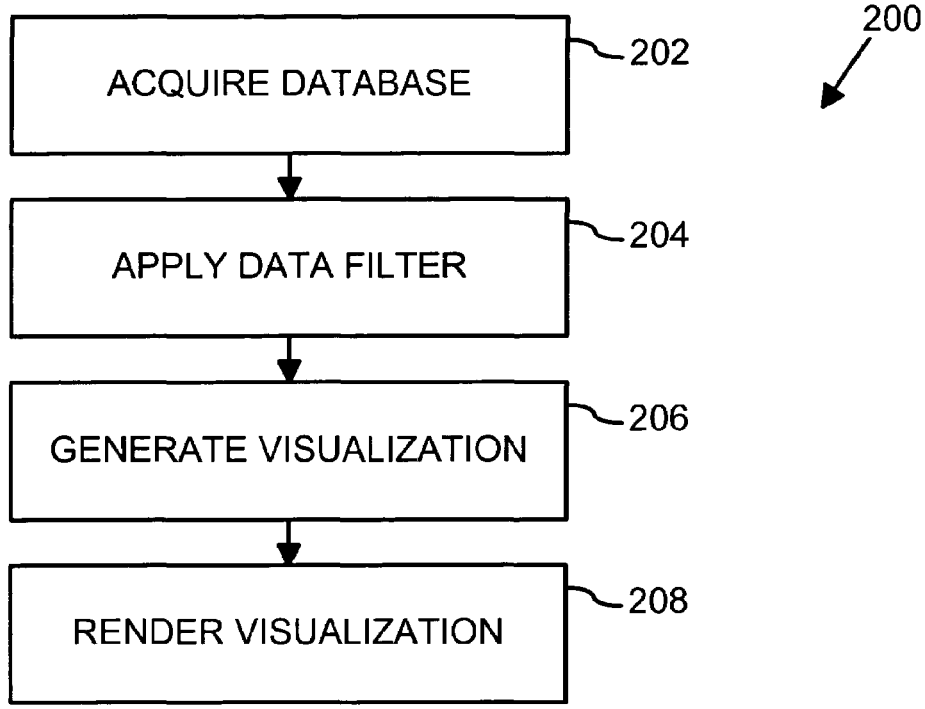
FIG. 10 is a flow diagram of a computer-controlled threaded information visualization process for visualizing threaded information.

FIG. 10 is a flow diagram of a computer-controlled interactive threaded information visualization process 200 for visualizing a threaded information environment, such as for example, information relating to a Usenet newsgroups, e-mail, etc.

Process block 202 indicates that a database is acquired for the threaded information. In one implementation the database is a relational database. With reference to obtaining information relating to a Usenet newsgroup, for example, information is obtained from the header of each posting in the selected set of newsgroups.

In one implementation, information may be obtained from the following fields in the header of each posting: From, Newsgroups, Subject, Date, Organization, Lines, Message-ID, and References. The From field identifies the poster and may include his email address and name. The Newsgroups field includes the names of other groups to which the post is cross-posted. The Subject field states the topic or title of the post. The Date field includes the time, date, and time zone of the post. The Organization includes the organization with which the poster is associated. The Lines field includes the number of lines of text in the post body. The Message-ID is a unique identifier for the post. The References field includes lists of Message-Ids of parent and ancestor messages.

Process block 204 indicates that the database is data-filtered to extract selected information, such as information about the times of the postings, amounts of information in the postings, frequencies at which posters contribute to the group, etc. This data filtering process provides a filtered set of threaded information.

Process block 206 indicates that a visualization format is generated according the filtered set of threaded information. The visualization is generated according to a selected visualization format. With reference to threaded information relating to Usenet newsgroups, for example, the selected visualization format could be any of formats 120, 130, 140, 150, or 160, or any combination of them. The visualization format may be selected by an observing user through a graphical user interface, for example. Alternatively, the format may be selected by the presenter of the threaded information.

Process block 208 indicates that the visualization is rendered on a display screen according to selected visualization style components.

Figure 11:
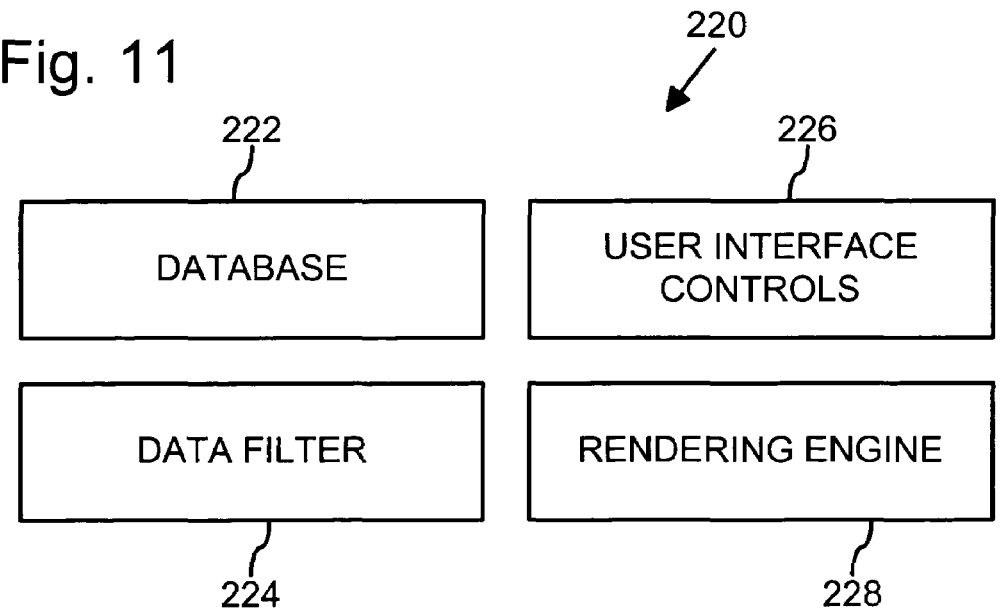
FIG. 11 is a block diagram of a threaded information visualization software system operable within a computer-readable medium according to the visualization process of FIG. 10.

FIG. 11 is a block diagram of an interactive collaborative information visualization software system 220 operable within a computer-readable medium according to visualization process 200. Visualization system 220 includes a database 222 (e.g., a relational database) of threaded information. A database filter 224 filters database 222 according to filter parameters or queries specified by a user. Database filter 224 may function as a generally conventional relational database filter.

Graphical user interface controls 226 are rendered on a display screen and allow a user to select or modify, for example, any one or combination of visualization formats 120, 130, 140, 150, and 160. A rendering engine 228 renders a network graphical visualization according to results obtained by database filter 224 and visualization format selections made with user interface controls 226.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A method for presenting threaded information entries as a graphical representation of threaded information rendered on a display interface, the method comprising:
    identifying a structure associated a plurality of threaded information entries, the threaded information entries including top-level entries and other threaded information entries;
    rendering top-level entries as a first set of substantially linear-shaped graphical representations without text on the display interface; and
    for each top-level threaded information entry, rendering other threaded information entries corresponding to the top-level threaded information entry as a second set of substantially linear-shaped graphical representations without text below the graphical representation representing the top-level entry, the second set of substantially linear-shaped graphical representations representing the other corresponding threaded information entries and being indented in accordance with the identified structure.

2. The method of claim 1 in which the threaded information entries include plural fields of entry-information and in which the entry lines are rendered with variations corresponding to information in one or more of the predefined fields of entry information.

3. The method of claim 2 in which individual entry lines are rendered with colors corresponding to information in one or more of the predefined fields of the entry information for the individual threaded information entries.

4. The method of claim 3 in which each information entry has an originator and in which the one or more predefined fields of entry information relate to the originator of the information entry and the originator is indicated in the entry line for the information entry.

5. The method of claim 4 in which plural information entries may share a common originator and in which the color of an entry line corresponds to the number of information entries provided by the originator of the entry line.

6. The method of claim 3 in which each information entry has an associated time and in which the one or more predefined fields of entry information relate to the associated time of the information entry and the associated time is indicated by positioning of the entry line for the information entry.

7. The method of claim 3 in which the entry lines are rendered with lengths corresponding to information in one or more of the predefined fields of entry information.

8. The method of claim 7 in which the entry lines are rendered at positions corresponding to information in one or more of the predefined fields of entry information.

9. The method of claim 2 in which the entry lines are rendered with lengths corresponding to information in one or more of the predefined fields of entry information.

10. The method of claim 9 in which each information entry includes an amount of information and in which the one or more predefined fields of entry information relates to the amount of information in the information entry.

11. The method of claim 9 in which the entry lines are rendered at positions corresponding to information in one or more of the predefined fields of entry information.

12. The method of claim 2 in which the entry lines are rendered at positions corresponding to information in one or more of the predefined fields of entry information.

13. The method of claim 12 in which each information entry has an associated time and in which the one or more predefined field of entry information relate to the associated time of the information entry and the associated time is indicated by positioning of the entry line for the information entry.

14. The method of claim 1 in which the threaded information includes threads that begin with top-level information entries, the graphical representation further comprising text information only about top-level information entries.

15. The method of claim 1 in which the entry lines are horizontal.

16. The method of claim 1 in which the entry lines are arranged vertically.

17. The method of claim 1 in which the threaded information includes threads that begin with top-level information entries and in which the entry indicators representing the top-level information entries include spacing between them transverse to the linear-shaped graphical representations.

18. The method of claim 17 in which plural ones of the entry indicators are positioned together to represent a thread of threaded information and in which the entry indicators representing the thread include no spacing between them transverse to the linear-shaped graphical representations.

19. The method of claim 1 in which plural ones of the entry indicators are positioned together to represent a thread of threaded information and in which the entry indicators representing the thread include no spacing between them transverse to the linear-shaped graphical representations.

20. The method of claim 1 in which the entry lines associated with the information entries of a user-selected thread are replaced with enlarged entry bars.

21. The method of claim 20 in which the threaded information includes threads that begin with top-level information entries and in which the visualization further comprises at least one of either text information or any other perceptible character-based representation only about a top-level information entry of the selected thread.

22. The method of claim 20 in which user-selected enlarged entry bars are distinguished from other enlarged entry bars.

23. At least one computer readable medium having instructions stored thereon, which when executed by at least one processing system, cause the processing system to implement threaded information visualization software providing a visualization of threaded information that includes plural threaded information entries, the at least one medium comprising:

rendering engine instructions for
identifying a structure associated a plurality of threaded information entries, the threaded information entries including top-level entries and other threaded information entries;
rendering top-level entries as a first set of substantially linear-shaped graphical representations without text on the display interface; and
for each top-level threaded information entry, rendering other threaded information entries corresponding to the top-level threaded information entry as a second set of substantially linear-shaped graphical representations without text below the graphical representation representing the top-level entry, the second set of substantially linear-shaped graphical representations representing the other corresponding threaded information entries and being indented in accordance with the identified structure.

24. The medium of claim 23 further comprising user interface control instructions for allowing a user to select from among plural visualization formats that each include an indented threading arrangement of the substantially linear-shaped graphical representations.

25. The medium of claim 23 in which the threaded information entries include plural fields of entry information and in which individual entry lines are rendered with variations corresponding to information in one or more of the predefined fields of the entry information for the individual threaded information entries.

26. The medium of claim 25 in which the entry lines are rendered with colors corresponding to information in one or more of the predefined fields of entry information.

27. The medium of claim 26 in which each information entry has an originator and in which the one or more predefined fields of entry information relate to the originator of the information entry and the originator is indicated in the entry line for the information entry.

28. The medium of claim 27 in which plural information entries may share a common originator and in which the color of an entry line corresponds to the number of information entries provided by the originator of the entry line.

29. The medium of claim 25 in which each information entry has an associated time and in which the one or more predefined fields of entry information relate to the associated time of the information entry and the associated time is indicated by positioning of the entry line for the information entry.

30. The medium of claim 25 in which the entry lines are rendered with lengths corresponding to information in one or more of the predefined fields of entry information.

31. The medium of claim 30 in which the entry lines are rendered at positions corresponding to information in one or more of the predefined fields of entry information.

32. The medium of claim 25 in which the entry lines are rendered with lengths corresponding to information in one or more of the predefined fields of entry information.

33. The medium of claim 32 in which each information entry includes an amount of information and in which the one or more predefined fields of entry information relate to the amount of information in the information entry.

34. The medium of claim 32 in which the entry lines are rendered at positions corresponding to information in one or more of the predefined fields of entry information.

35. The medium of claim 25 in which the entry lines are rendered at lateral positions corresponding to information in one or more of the predefined fields of entry information.

36. The medium of claim 35 in which each information entry has an associated time and in which the one or more predefined fields of entry information relate to the associated time of the information entry and the associated time is indicated by positioning of the entry line for the information entry.

37. The medium of claim 23 in which the entry lines are horizontal.

38. The medium of claim 23 in which the entry lines are arranged vertically.

39. The medium of claim 23 in which the threaded information includes threads that begin with top-level information entries, the visualization further comprising at least one of either text information or any other perceptible character-based representation only about top-level information entries.

40. The medium of claim 23 in which the entry lines associated with the information entries of a user-selected thread are replaced with enlarged entry bars.

41. The medium of claim 40 in which the threaded information includes threads that begin with top-level information entries and in which the visualization further comprises at least one of either text information or any other perceptible character-based representation only about a top-level information entry of the selected thread.

42. The medium of claim 40 in which user-selected enlarged entry bars are distinguished from other enlarged entry bars.

43. A computer-readable medium encoded with computer-executable instructions for performing steps comprising:

identifying a set of threads associated with a newsgroup;
determining a structure associated with the set of threads;
rendering, on a graphical display, top-level threads within the set of threads as a first set of generally one-dimensional entry lines, each one-dimensional entry line having a thickness insufficient to render text characters;
for each top-level thread, rendering, on the graphical display, inferior threads corresponding to the top-level thread as a second set of one-dimensional entry lines below the entry line associated with the top-level thread, the second set of one-dimensional entry lines associated with the inferior threads and being indented in accordance with the determined structure; and
in response to a selection to highlight at least one of the one-dimensional entry lines in the second set,
identifying the inferior thread associated with the highlighted entry line;
identifying the top-level thread associated with the identified inferior thread; and
displaying information about the identified top-level thread.

44. The computer-readable medium as recited in claim 43, the steps further comprising indenting the second set of one-dimensional entry lines associated with the inferior threads in accordance with the times at which the inferior threads were posted.

45. The computer-readable medium as recited in claim 43, the steps further comprising rendering each one-dimensional entry line with a length corresponding to the amount of information included in the thread associated with the one-dimensional entry line.

46. The computer-readable medium as recited in claim 43, the steps further comprising rendering each one-dimensional entry line with a color corresponding to at least one of a characteristic of the author of the thread associated with the line or the age of the thread.

47. The computer-readable medium as recited in claim 43, wherein information displayed about the identified top-level thread associated with the highlighted one-dimensional entry line includes a text label.

48. The computer-readable medium as recited in claim 43, the steps further comprising in response to the selection to highlight at least one of the one-dimensional lines in the first set,
- identifying the top-level thread associated with the highlighted one-dimensional line;
- identifying the inferior threads associated with the identified top-level thread;
- displaying the inferior threads as selectable bars; and
- in response to a selection of at least one selectable bar, displaying the information associated with the inferior thread corresponding to the selected bar.

49. The computer-readable medium as recited in claim 43, wherein the threads in the set include at least one of messages or posts associated with the newsgroup.

* * * * *